United States Patent
Gao

(10) Patent No.: US 11,934,648 B2
(45) Date of Patent: Mar. 19, 2024

(54) PERMISSION SETTING METHOD AND APPARATUS AND ELECTRONIC DEVICE

(71) Applicant: VIVO MOBILE COMMUNICATION CO., LTD., Guangdong (CN)

(72) Inventor: Meng Gao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/112,567

(22) Filed: Feb. 22, 2023

(65) Prior Publication Data

US 2023/0195298 A1 Jun. 22, 2023

Related U.S. Application Data

(63) Continuation of application No. PCT/CN2021/115117, filed on Aug. 27, 2021.

(30) Foreign Application Priority Data

Aug. 28, 2020 (CN) .......................... 202010886296.7

(51) Int. Cl.
*G06F 3/048* (2013.01)
*G06F 3/0482* (2013.01)
(Continued)

(52) U.S. Cl.
CPC ........ *G06F 3/04847* (2013.01); *G06F 3/0482* (2013.01); *G06F 3/0486* (2013.01); *G06F 21/629* (2013.01)

(58) Field of Classification Search
CPC .. G06F 3/04847; G06F 3/0482; G06F 3/0486; G06F 21/629; G06F 3/04817; G06F 21/604; G06F 21/105; G06F 2221/2141
See application file for complete search history.

(56) References Cited

U.S. PATENT DOCUMENTS

2013/0246970 A1* 9/2013 Helle ..................... G06F 3/0482
 715/822
2014/0380239 A1* 12/2014 Kang .................. G06F 3/04842
 715/810
(Continued)

FOREIGN PATENT DOCUMENTS

CN 106227414 A * 12/2016 ......... G06F 3/04817
CN 106528131 A 3/2017
(Continued)

OTHER PUBLICATIONS

First Office Action for Chinese Application No. 202010886296.7, dated Jul. 12, 2021, 8 Pages.
(Continued)

*Primary Examiner* — Rashawn N Tillery
(74) *Attorney, Agent, or Firm* — BROOKS KUSHMAN P.C.

(57) ABSTRACT

A permission setting method and apparatus and an electronic device belong to the field of communication technologies. The method includes: displaying a first control on a desktop; receiving a first input to the first control and a first icon by a user; and setting a first function permission for a first application program in response to the first input, where the first application program is an application program indicated by the first icon, and the first function permission is a function permission in a plurality of function permissions associated with the first control. The method may be applied to a scenario of performing quick management on a function permission of an application program.

17 Claims, 7 Drawing Sheets

(51) Int. Cl.
*G06F 3/04847* (2022.01)
*G06F 3/0486* (2013.01)
*G06F 21/62* (2013.01)

(56) References Cited

U.S. PATENT DOCUMENTS

| | | | |
|---|---|---|---|
| 2015/0052464 A1* | 2/2015 | Chen | G06F 3/167 |
| | | | 715/765 |
| 2016/0018941 A1* | 1/2016 | Kim | G06F 9/451 |
| | | | 345/173 |
| 2016/0041719 A1 | 2/2016 | Wang et al. | |
| 2016/0259516 A1 | 9/2016 | Kudurshian et al. | |
| 2017/0277400 A1* | 9/2017 | Lee | G06F 3/04817 |
| 2017/0308225 A1* | 10/2017 | Baek | G06F 3/0482 |
| 2018/0011630 A1* | 1/2018 | Kim | G06F 1/1626 |

FOREIGN PATENT DOCUMENTS

| | | | | | |
|---|---|---|---|---|---|
| CN | 107257951 | A | | 10/2017 | |
| CN | 108391007 | A | * | 8/2018 | ............. H04M 1/60 |
| CN | 110032422 | A | * | 7/2019 | |
| CN | 110058754 | A | | 7/2019 | |
| CN | 110502878 | A | * | 11/2019 | |
| CN | 110502878 | A | | 11/2019 | |
| CN | 110764845 | A | * | 2/2020 | |
| CN | 110764845 | A | | 2/2020 | |
| CN | 111966258 | A | | 11/2020 | |
| CN | 113835588 | A | * | 12/2021 | |
| WO | 2005091123 | A1 | | 9/2005 | |
| WO | WO-2019174611 | A1 | * | 9/2019 | ........... G06F 3/0482 |
| WO | WO-2020006669 | A1 | * | 1/2020 | |

OTHER PUBLICATIONS

Second Office Action for Chinese Application No. 202010886296.7, dated Jan. 5, 2022, 6 Pages.

International Search Report and Written Opinion for Application No. PCT/CN2021/115117, dated Nov. 26, 2021, 8 Pages.

* cited by examiner

PERMISSION SETTING METHOD AND APPARATUS AND ELECTRONIC DEVICE

CROSS-REFERENCE TO RELATED APPLICATIONS

This application is a continuation of International Application No. PCT/CN2021/115117 filed on Aug. 27, 2021, which claims priority to Chinese Patent Application No. 202010886296.7 filed on Aug. 28, 2020, which are incorporated herein by reference in their entireties.

TECHNICAL FIELD

This application belongs to the field of communication technologies, and specifically, relates to a permission setting method and apparatus and an electronic device.

BACKGROUND

As the functions of a mobile phone increase gradually, application programs installed on a mobile phone increase gradually as well.

Usually, a user may perform various permission management for an application program in a mobile phone manager or a mobile phone setting application. For example, when a user intends to disable an application program from using a mobile network, the user may open a mobile phone manager first, find the application program in the mobile phone manager, and then open a permission interface corresponding to the application program, so that the user may perform an operation on a mobile network data option in the permission interface to trigger the mobile phone to disable the application program from using the mobile network.

For the manner of performing various permission management for an application program in a mobile phone manager or a mobile phone setting application, a user needs to perform a plurality of operations to complete the setting of one permission. As a result, the manner of setting permissions for an application program is relatively complex in the prior art.

SUMMARY

An objective of embodiments of this application is to provide a permission setting method and apparatus and an electronic device.

To resolve the foregoing technical problem, this application is implemented as follows:

According to a first aspect, an embodiment of this application provides a permission setting method. The method includes: displaying a first control on a desktop; receiving a first input to the first control and a first icon by a user; and setting a first function permission for a first application program in response to the first input, where the first application program is an application program indicated by the first icon, and the first function permission is a function permission in a plurality of function permissions associated with the first control.

According to a second aspect, an embodiment of this application provides a permission setting apparatus. The permission setting apparatus includes a display module, a receiving module, and a processing module. The display module is configured to display a first control on a desktop. The receiving module is configured to receive a first input to the first control and a first icon by a user. The processing module is configured to set a first function permission for a first application program in response to the first input received by the receiving module, where the first application program is an application program indicated by the first icon, and the first function permission is a function permission in a plurality of function permissions associated with the first control.

According to a third aspect, an embodiment of this application provides an electronic device, where the electronic device includes a processor, a memory, and a program or an instruction stored in the memory and capable of being run on the processor, and the program or the instruction, when executed by the processor, implements the steps of the method according to the first aspect.

According to a fourth aspect, an embodiment of this application provides a readable storage medium, where the readable storage medium stores a program or an instruction, and the program or the instruction, when executed by a processor, implements the steps of the method according to the first aspect.

According to a fifth aspect, an embodiment of this application provides a chip, where the chip includes a processor and a communications interface, the communications interface is coupled with the processor, and the processor is configured to run a program or an instruction, to implement the method according to the first aspect.

In the embodiments of this application, a first control may be displayed on a desktop; a first input to the first control and a first icon by a user may be received; and a first function permission may be set for a first application program in response to the first input, where the first application program is an application program indicated by the first icon, and the first function permission is a function permission in a plurality of function permissions associated with the first control. According to this solution, because the first control associated with the plurality of function permissions may be displayed on the desktop, the user may use an input to the first control and the first icon to trigger a quick setting of the first function permission for the application program indicated by the first icon, thereby simplifying steps of setting a function permission for an application program and improving efficiency of setting a function permission for an application program.

DETAILED DESCRIPTION

The following clearly describes the technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of the embodiments of this application, the terms "first", "second", and so on are intended to distinguish between similar objects but do not indicate a particular order or sequence. It should be understood that the data so used may be interchanged in an appropriate condition, so that the embodiments of this application can be implemented in an order other than those illustrated or described herein. In addition, objects distinguished by "first" and "second" are usually a same type, and a quantity of the objects is not limited, for example, a first object may be one or may be a plurality. In addition, "and/or" in this specification and the claims represents at least one of the connected objects. A character "I" generally indicates an "or" relationship between the associated objects.

The embodiments of this application provide a permission setting method and apparatus and an electronic device. A first control may be displayed on a desktop; a first input to the first control and a first icon by a user may be received; and a first function permission may be set for a first application program in response to the first input, where the first application program is an application program indicated by the first icon, and the first function permission is a function permission in a plurality of function permissions associated with the first control. According to this solution, because the first control associated with the plurality of function permissions may be displayed on the desktop, the user may use an input to the first control and the first icon to trigger a quick setting of the first function permission for the application program indicated by the first icon, thereby simplifying steps of setting a function permission for an application program and improving efficiency of setting a function permission for an application program.

The following describes the permission setting method and apparatus and the electronic device provided in the embodiments of this application in detail with reference to the accompanying drawings by using specific embodiments and application scenarios thereof.

Figure 1:
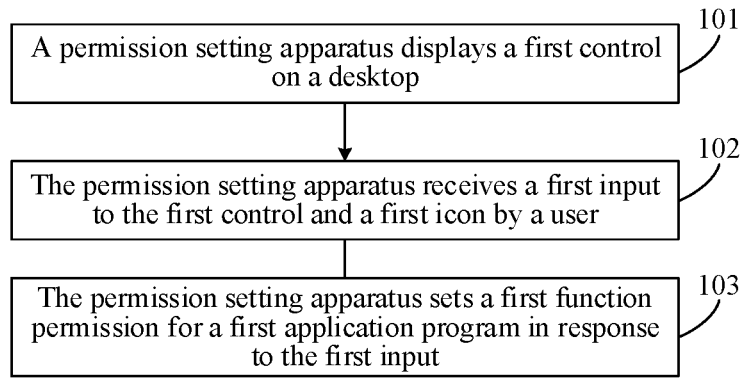
FIG. 1 is a schematic diagram 1 of a permission setting method according to an embodiment of this application.

As shown in FIG. 1, an embodiment of this application provides a permission setting method. The method may include the following step 101 to step 103. The method is described below by using an example in which an execution subject is a permission setting apparatus.

Step 101: The permission setting apparatus displays a first control on a desktop.

Optionally, the permission setting apparatus provided in this embodiment of this application includes a plurality of desktops, that is, a plurality of desktop interfaces. The desktop in the foregoing step 101 may be a main desktop interface in the plurality of desktops or may be any other desktop interface. This is not limited in this embodiment of this application.

Optionally, the first control may be a floating control (for example, a floating ball) with a floating display function or may be a control displayed at a fixed location. A floating ball in the prior art usually has conventional functions such as invoking and displaying a home screen, a notification message, a voice assistant, returning to a desktop, and the like. Different from the foregoing floating ball, when the first control is a floating control with a floating display function, the first control provided in this embodiment of this application has association relationships with a plurality of function permissions, so as to quickly invoke the plurality of function permissions, and perform a quick setting for a function permission for an application program indicated by an icon. It is not necessary to perform management on various permissions in an application program manager or a setting application.

Optionally, in one manner, when it is detected that a currently displayed interface is the desktop, the permission setting apparatus may automatically invoke and display the first control. In another manner, when displaying the desktop, the permission setting apparatus invokes and displays the first control in response to an input by a user.

Optionally, the first control may be displayed in a side area of the desktop, and the size of the first control is a relatively small preset size. This can keep the first control from covering content on the desktop.

For example, the user may swipe a finger in a preset direction in the side area of the desktop, long press an icon on the desktop, or press a preset physical key, to trigger the permission setting apparatus to display, in response to the input by the user, the first control of the preset size in the side area of the desktop.

Step 102: The permission setting apparatus receives a first input to the first control and a first icon by a user.

The foregoing first input may be used to trigger a setting of a first function permission for a first application program. The first icon may be an icon on the desktop in step 101, an icon on another desktop, or an icon in a folder on a desktop. This is not limited in this embodiment of this application.

In a first optional implementation, the first input includes an input of dragging the first icon to an area in which the first control is located. In a second optional implementation, the first input includes an input of dragging the first control to an area in which the first icon is located by the user. In a third optional implementation, the first input includes a click input to the first control and the first icon by the user. The first input may be any other possible input. This is not limited in this embodiment of this application. It should be noted that, in a case that input manners of the first input are different, function permissions set for the first application program are different. A specific implementation is described in the following embodiment, and details are not described herein again.

Step 103: The permission setting apparatus sets a first function permission for a first application program in response to the first input.

The application program is an application program indicated by the first icon. The first function permission is a function permission in a plurality of function permissions associated with the first control. Specifically, the first function permission is at least one function permission in the plurality of function permissions associated with the first control.

Optionally, one or more first icons may be provided. When one first icon is provided, one first application program is provided, so that the permission setting apparatus may set the first function permission for one application program. Alternatively, when a plurality of first icons are provided, a plurality of first application programs are provided, so that the permission setting apparatus may simultaneously set the first function permission for a plurality of application programs.

In this embodiment of this application, the first control is associated with a plurality of preset function permissions. One function permission may be specifically enabling one function or disabling one function. These function permissions may include at least one of (a) to (i):

(a) Disable wireless data or enable wireless data, where the wireless data includes at least one of the following: wireless local area network (WLAN) data and mobile network data.

(b) Disable notification messages or enable notification messages, where the notification message includes at least one of the following: a notification message pushed by a server, a notification message sent to an application program by an operating system, a notification message sent to a notification bar by an application program, and the like.

(c) Disable self-booting or enable self-booting.

(d) Disable refresh of a background application or enable refresh of a background application.

(e) Disable a voice assistant function or enable a voice assistant function.

(f) Disable location acquisition or enable location acquisition.

(g) Disable camera invocation or enable camera invocation.

(h) Disable automatic update of an application version or enable automatic update of an application version.

(i) Disable a password-free payment function or enable a password-free payment function.

According to the permission setting method provided in this embodiment of this application, a first control may be displayed on a desktop; a first input to the first control and a first icon by a user may be received; and a first function permission may be set for a first application program in response to the first input, where the first application program is an application program indicated by the first icon, and the first function permission is a function permission in a plurality of function permissions associated with the first control. According to this solution, because the first control associated with the plurality of function permissions may be displayed on the desktop, the user may use an input to the first control and the first icon to trigger the quick setting the first function permission for the application program indicated by the first icon, thereby simplifying steps of setting a function permission for an application program and improving efficiency of setting a function permission for an application program.

Figure 2:
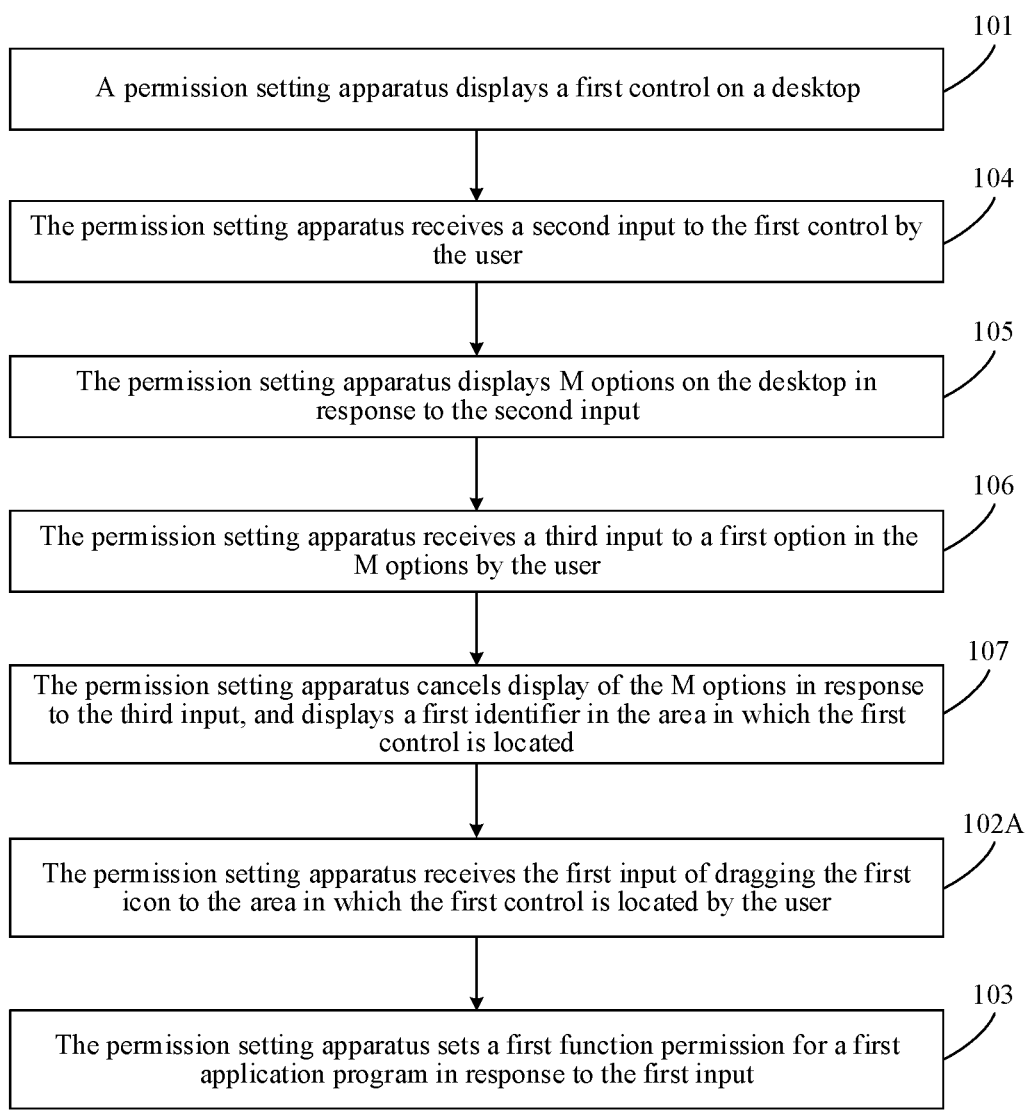
FIG. 2 is a schematic diagram 2 of a permission setting method according to an embodiment of this application.

Optionally, with reference to FIG. 1, as shown in FIG. 2, in a case that the first input is the input of dragging the first icon to the area in which the first control is located, before the foregoing step 102, the permission setting method provided in this embodiment of this application may further include the following step 104 to step 107, and the foregoing step 102 may be implemented by using the following step 102A.

Step 104: The permission setting apparatus receives a second input to the first control by the user.

Step 105: The permission setting apparatus displays M options on the desktop in response to the second input.

In this embodiment of this application, in a case that the desktop displays the first control in a floating manner, the user may use the second input (for example, a click input) to the first control trigger display of the M options on the desktop. Further, the user may use another input (for example, a long-press input) to the first control to trigger an execution of a conventional function, for example, invoking and displaying a home screen, a notification message, a voice assistant, and returning to a desktop.

Each option in the foregoing M options may be used for indicating at least one function permission respectively. M is a positive integer. Specifically, if one option is used for indicating one function permission, the one function permission may be any one of (a) to (i) in the foregoing step 103, for example, "disable wireless data". If one option is used for indicating a plurality of function permissions, the plurality of function permissions may be a group of function permissions set for an application program of one type, for example, a plurality of function permissions corresponding to an application program of a video type, including "disable wireless data", "disable notification messages", "enable self-booting", and the like.

Optionally, the first control may be displayed in a first area of a screen, and M options may be displayed in a second area of the screen. The first area and the second area are adjacent display areas, and the size of the second area is larger than the size of the first area.

Figure 3:
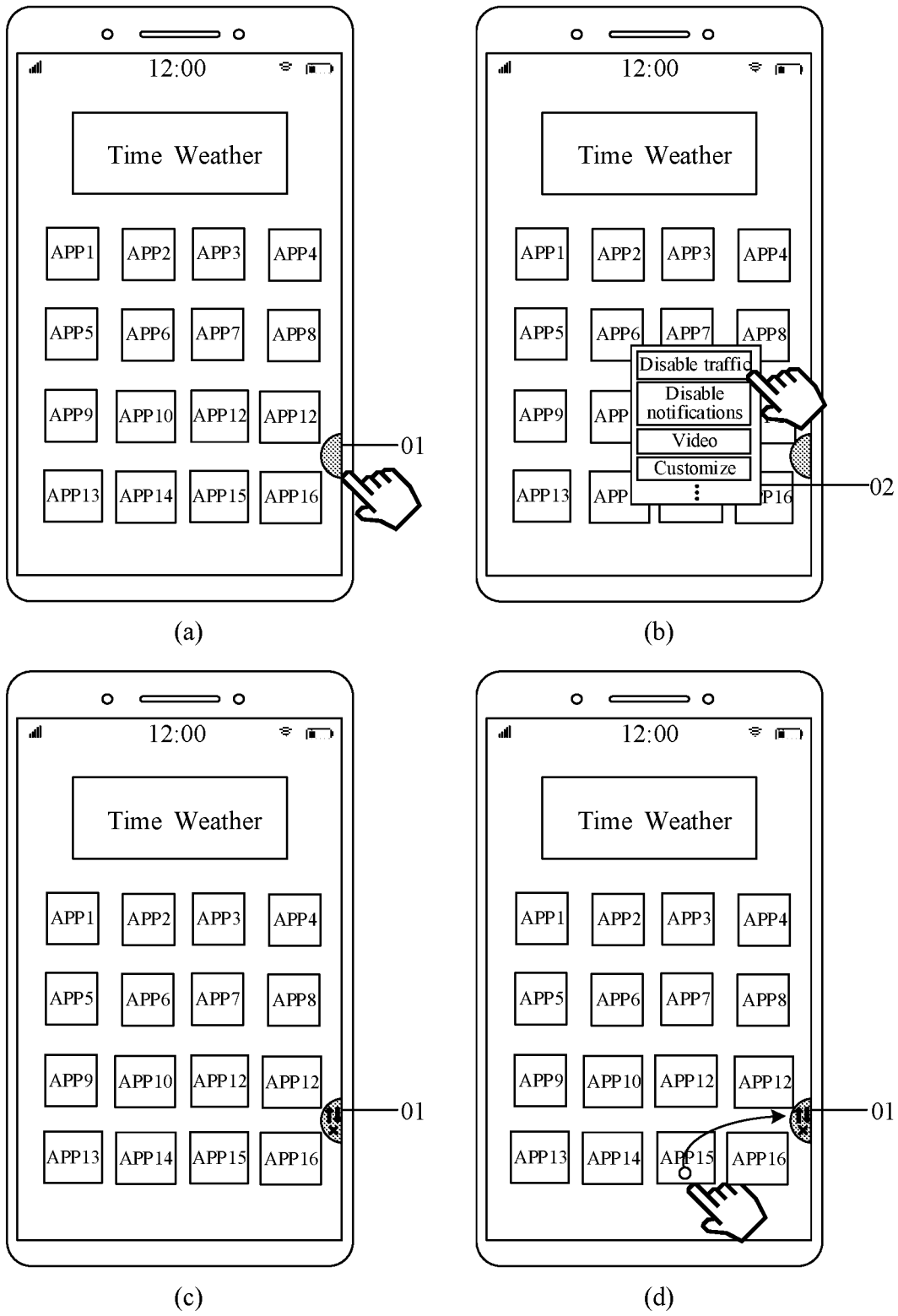
FIG. 3 is a schematic diagram 1 of an operation on a first icon and a first control according to an embodiment of this application.

For example, as shown in (a) of FIG. 3, when the user intends to quickly set a function permission for an application program on the desktop, the user may use a swipe input in a side area of the screen to trigger the permission setting apparatus to display a first control 01 in the side area, and click the first control 01. Subsequently, as shown in (b) of FIG. 3, the permission setting apparatus may display a plurality options 02 in a list form on the desktop in response to a click input by the user. An option "Disable data" is used for instructing to disable wireless data, an option "Disable notifications" is used for instructing to disable notification messages, an option "Video" is used for indicating a group of function permissions corresponding to video-type application programs, and an option "Customize" is used for the user to manually add a function permission option.

Step 106: The permission setting apparatus receives a third input to a first option in the M options by the user.

Step 107: The permission setting apparatus cancels display of the M options in response to the third input, and displays a first identifier in the area in which the first control is located.

In this embodiment of this application, the first identifier and the first option may be both used for indicating the first function permission. Differences between the first identifier and the first option are as follows: If the user clicks the first identifier, it indicates that the user selects the first function permission from the plurality of function permissions. Therefore, the permission setting apparatus may cancel display of the plurality of function permissions and display the first identifier in the area in which the first control is located, so as to keep the plurality of function permissions covering icons on the desktop and make it convenient for the user to select an icon on the desktop. The first identifier is displayed in the area in which the first control is located to prompt the user that the first function permission has been selected, and the first function permission may be quickly set for an application program by an input to an icon and the first control on the desktop.

It should be noted that, when the user selects different options from the M options, display forms of icons displayed in the area in which the first control is located may be different, to help the user distinguish selected function permissions, making it convenient for the user to quickly set a function permission.

Step 102A: The permission setting apparatus receives the first input of dragging the first icon to the area in which the first control is located by the user.

For example, after the user clicks an option "Disable traffic" shown in (b) of FIG. 3, as shown in (c) of FIG. 3, the permission setting apparatus may cancel display of all function options and display one first identifier in an area in which the first control 01 is located. The first identifier is used for indicating a function permission "Disable traffic". Further, as shown in (d) of FIG. 3, if the user drags "APP15" to the area in which the first control 01 is located, the permission setting apparatus may quickly set a function permission "disable wireless data" for an application program indicated by "APP15".

Optionally, after receiving the third input, the permission setting method provided in this embodiment of this application may further include: The permission setting apparatus displays one second identifier on each icon of N icons on the desktop respectively in response to the third input. For the each icon of N icons, a second identifier on one icon is used for indicating that the first function permission has been set for an application program indicated by the one icon, and N is a positive integer.

Figure 4:
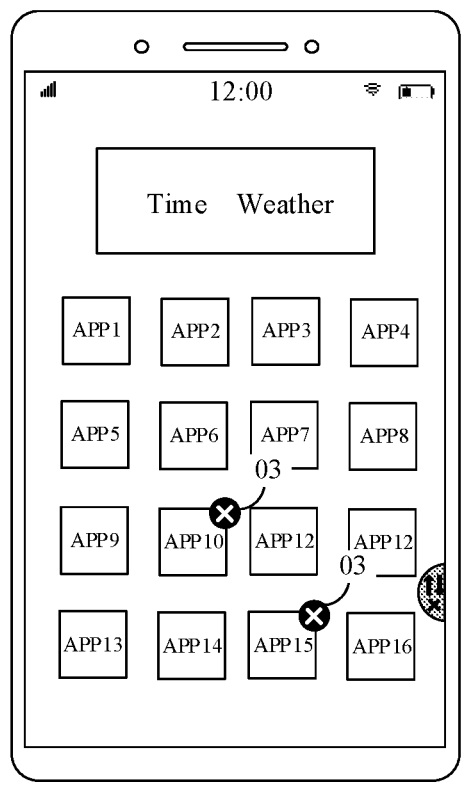
FIG. 4 is a schematic diagram of displaying a second identifier according to an embodiment of this application.

For example, after the user selects the option "Disable traffic" shown in (b) of FIG. 3, if the permission setting apparatus determines that the function permission "disable wireless data" is set for both two application programs indicated by "APP10" and "APP15", as shown in FIG. 4, one second identifier 03 may be displayed at an upper right corner of each of an icon of "APP10" and an icon of "APP15".

If the permission setting apparatus determines that the function permission "disable wireless data" is set for one application program indicated by "APP10", one second identifier 03 may be displayed only at the upper right corner of the icon of "APP10". Further, if the user drags "APP15" to the area in which the first control 01 is located, the permission setting apparatus may quickly set the function permission "disable wireless data" for an application program indicated by "APP15", and display one second identifier 03 at the upper right corner of the icon of "APP15". That is, after the function permission "disable wireless data" is set for one application program each time, one second identifier may be displayed at an upper right corner of an icon of the one application program.

It may be understood that, when the second identifier is displayed on an icon of an application program for which the first function permission has been set, the user may be prompted that the first function permission has been set for the application program, making it convenient for the user to distinguish between the application program for which the first function permission has been set and an application program for which first function permission has not been set.

Optionally, the foregoing steps are exemplified by using an example of performing step 106 and step 107 after step 105. According to another implementation provided in this embodiment of this application, after the M options are displayed on the desktop in the foregoing step 105, the permission setting method provided in this embodiment of this application may further include the following step 108 to step 111.

Step 108: The permission setting apparatus receives a fourth input to the first option by the user.

It should be noted that, the fourth input is an input different from the third input. For example, the third input may be a click input to the first option, and the fourth input may be a long-press input.

Step 109: The permission setting apparatus displays P icons in response to the fourth input, where the first function permission has been set for all P application programs indicated by the P icons, and P is a positive integer.

Figure 5:
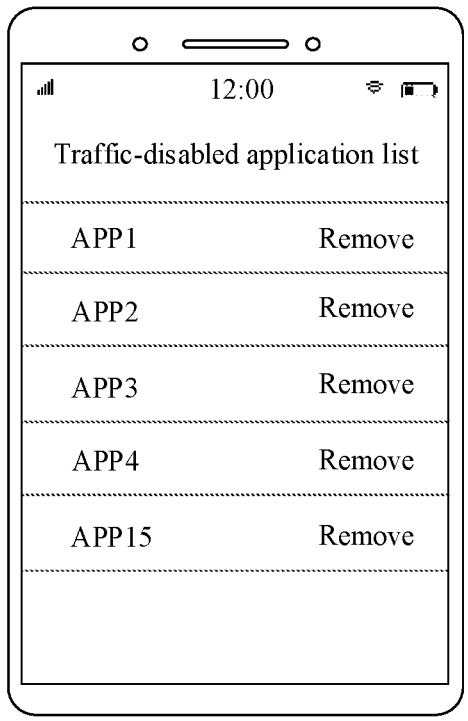
FIG. 5 is a schematic diagram of displaying a traffic-disabled application list according to an embodiment of this application.

Optionally, the foregoing P icons may be displayed in a target list. For example, the first option is "Disable traffic" shown in (b) of FIG. 3. After the user performs a long-press input on "Disable traffic", as shown in FIG. 5, the permission setting apparatus may change the desktop to display a traffic-disabled application list, or display the traffic-disabled application list on the desktop in a superimposed manner. The traffic-disabled application list may include icons of applications APP1, APP2, APP3, APP4, and APP15, and "disable wireless data" has been set for all the five applications.

Step 110: The permission setting apparatus receives a fifth input to a second icon in the P icons by the user.

Step 111: The permission setting apparatus cancels, in response to the fifth input, a setting of the first function permission for an application program indicated by the second icon.

For example, as shown in FIG. 5, each application of APP1, APP2, APP3, APP4, and APP15 corresponds to one removal control respectively. If the user clicks a removal control corresponding to APP1, the permission setting apparatus may delete, in response to the click input, an icon of APP1 from the traffic-disabled application list, and cancel a setting "disable wireless data" for APP1, to allow APP1 to use the wireless data.

According to the permission setting method provided in this embodiment of this application, an input to an option corresponding to one function permission may be used to trigger a display of all application programs for which this function permission has been set, so that the user manages these application programs collectively, for example, cancels a setting of a function permission for an application program.

Optionally, in a case that the first icon includes a plurality of sub-icons, the first input may be specifically an input of dragging a first sub-icon and a second sub-icon to the area in which the first control is located. For example, the foregoing step 102A may be specifically implemented by using the following step 102A1, and the foregoing step 103 may be specifically implemented by using the following step 103A.

Step 102A1: The permission setting apparatus receives the first input of dragging the first sub-icon and the second sub-icon to the area in which the first control is located by the user.

Step 103A: The permission setting apparatus determines a plurality of sub-icons according to the first sub-icon and the second sub-icon in response to the first input, and sets the first function permission for a plurality of application programs indicated by the plurality of sub-icons. The plurality of sub-icons includes the first sub-icon, the second sub-icon, and other sub-icons.

Optionally, the foregoing "determines a plurality of sub-icons according to the first sub-icon and the second sub-icon" includes several optional implementations as follows:

In a first optional implementation, a coordinate position of the first sub-icon and a coordinate position of the second sub-icon are acquired, and sub-icons through which a connection line of the two coordinate positions passes are determined as the foregoing other sub-icons.

Figure 6:
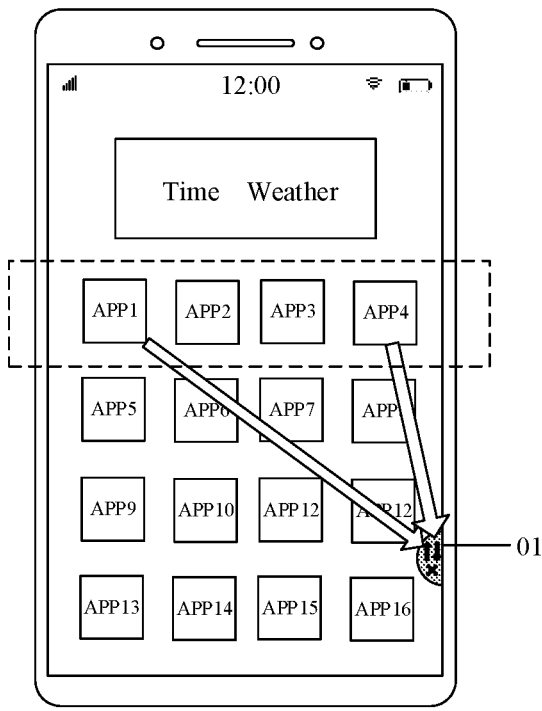
FIG. 6 is a schematic diagram 2 of an operation on a first icon and a first control according to an embodiment of this application.

For example, as shown in FIG. 6, two fingers of the user may respectively press "APP1" and "APP4", and perform dragging to the area in which the first control 01 is located along an arrow. The permission setting apparatus may acquire a coordinate position of "APP1" and a coordinate position of "APP4", and determine "APP2" and "APP3" through which a connection line of the two coordinate positions passes as the foregoing other sub-icons. Subsequently, the permission setting apparatus may set the first function permission for a plurality of application programs indicated by "APP1", "APP2", "APP3", and "APP4".

Optionally, the foregoing example is exemplified by using an example in which the user drags two icons. The user may drag three or more icons. In this case, sub-icons through which connection lines of coordinate positions of these icons pass may be determined as the foregoing other sub-icons, or sub-icons in an area defined by connection lines of coordinate positions of these icons may be determined as the foregoing other sub-icons, or sub-icons through which connection lines of coordinate positions of these icons pass and sub-icons in an area defined by connection lines of coordinate positions of these icons may be determined as the foregoing other sub-icons. This may be determined according to an actual use requirement, which is not limited in this embodiment of this application.

In a second optional implementation, an application type of an application program indicated by the first sub-icon and an application type of an application program indicated by the second sub-icon are acquired, and application programs meeting at least one application type of the two application types is acquired from all application programs indicated by icons on the desktop for use as the foregoing other sub-icons.

For example, assuming that an application type of an application program 1 indicated by the first sub-icon is a video type, and an application type of an application program 2 indicated by the second sub-icon is a game type. If an application program 3 and an application program 4 are of the video type, and an application program 5 is of the game type, the first function permission may be set for the application program 1, the application program 2, the application program 3, the application program 4, and the application program 5.

According to the permission setting method provided in this embodiment of this application, the first function permission may be simultaneously set for a plurality of application programs, and the user does not need to drag an icon of each application program one by one to the first control, thereby simplifying operations of setting a function permission for an application program by the user.

Optionally, in a case that the first application program belongs to a target type and the first option is specifically used for indicating a plurality of first function permissions corresponding to the target type, the user may use an input to the first option to implement a one-key setting of a function permission for an application program of the target type.

For example, before the foregoing step 104, the permission setting method provided in this embodiment of this application may further include the following step 112 and step 113.

Step 112: The permission setting apparatus receives a sixth input by the user.

Step 113: The permission setting apparatus creates association relationships between an application program of the target type and the plurality of first function permissions in response to the sixth input.

Optionally, after creating the association relationships between the application program of the target type and the plurality of first function permissions, the permission setting method provided in this embodiment of this application may further include: creating the first option indicating the plurality of first function permissions corresponding to the target type. Therefore, after the user performs an input to the first control, a plurality of displayed options includes the first option.

Figure 7:
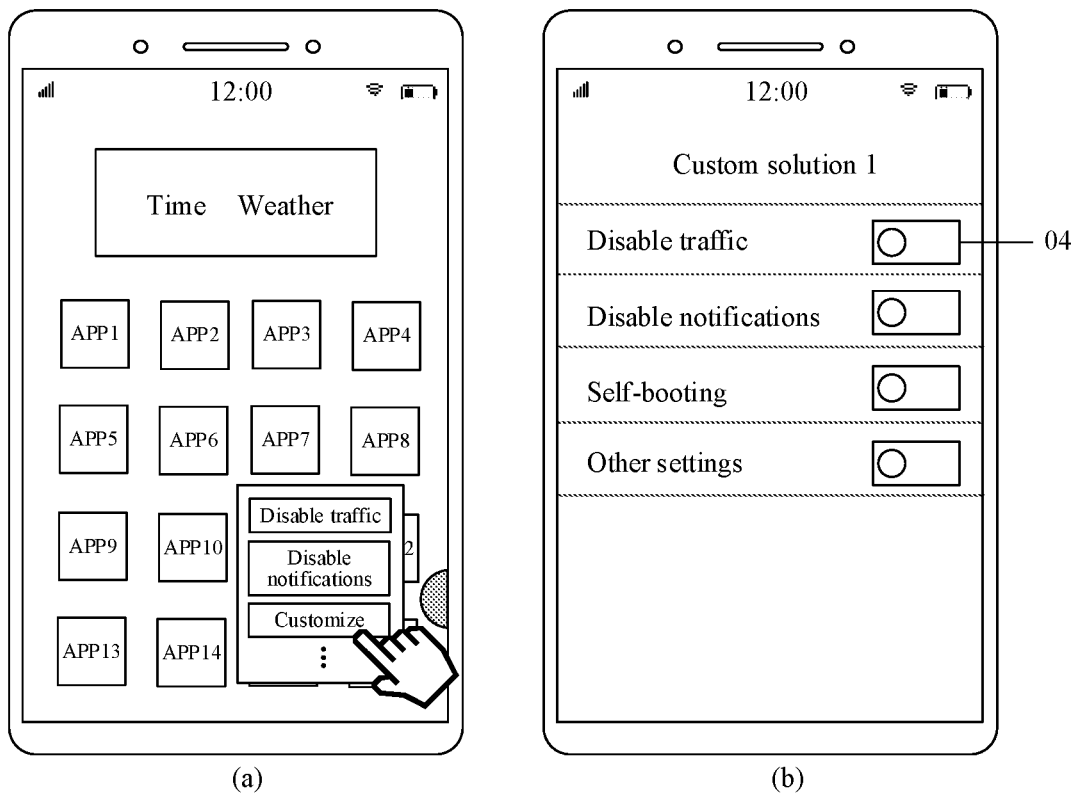
FIG. 7 is a schematic diagram 1 of a custom solution according to an embodiment of this application.

For example, as shown in FIG. 7 (*a*), after the user clicks the first control, options "Disable traffic", "Disable notifications", and "Customize" may be displayed in a list form. When the user intends to create an option for an application program of the video type, the user may click "Customize", and a customization interface shown in FIG. 7 (*b*) may be displayed. The interface may include a title option "Custom solution 1" and four function permissions, and each function permission corresponds to one switch control 04.

Figure 8:
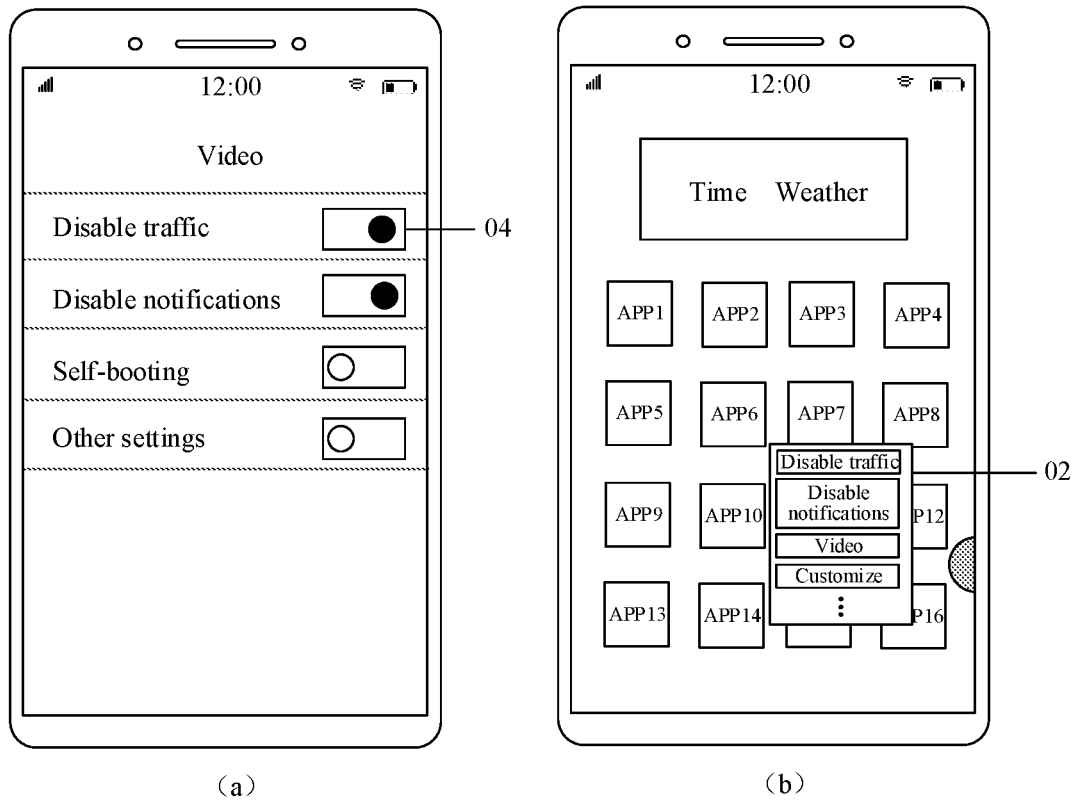
FIG. 8 is a schematic diagram 2 of a custom solution according to an embodiment of this application.

Further, as shown in FIG. 8 (*a*), the user may change "Custom solution 1" in the title option into "Video", and perform an input to the switch control 04 to trigger enabling of "Disable traffic" and "Disable notifications", that is, association relationships between the application program of the video type and "Disable traffic" and "Disable notifications" are created. Subsequently, as shown in FIG. 8 (*b*), when returning to the desktop, a "Video" option indicating "Disable traffic" and "Disable notifications" corresponding to the video type is added to a list 02.

It should be noted that, the foregoing embodiment is exemplified by using an example of a management solution of customizing a video-playing application program, which does not constitute a limitation. Further, a management solution of an application program of any other type, for example, a shopping application program or a game application program, may be customized. This is not limited in this embodiment of this application.

According to the permission setting method provided in this embodiment of this application, the user may customize a management solution of an application such as a management solution of a video-playing application program, a management solution of a shopping application program, and a management solution of a game application program. Therefore, when needing to set a function permission for a newly downloaded application program, the user may perform a one-key setting according to a type of the application program, thereby simplifying the steps of setting a permission for the application program.

Figure 9:
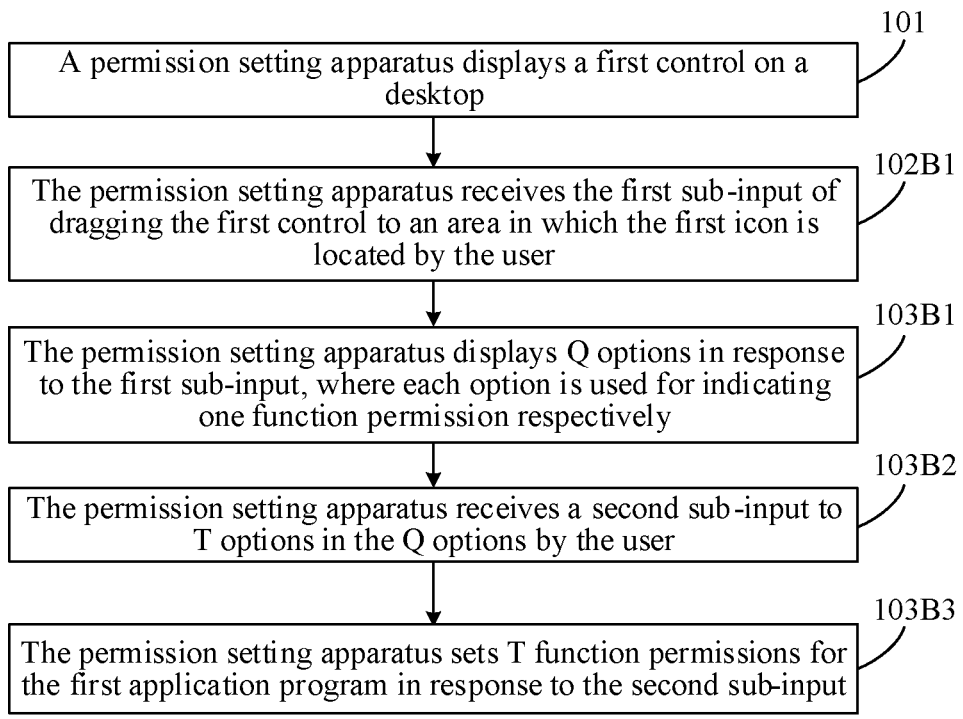
FIG. 9 is a schematic diagram 3 of a permission setting method according to an embodiment of this application.

Optionally, with reference to FIG. 1, as shown in FIG. 9, in a case that the first input includes the first sub-input and the second sub-input, the foregoing step 102 may be implemented by using the following step 102B1, and the foregoing step 103 may be implemented by using the following step 103B1 to step 103B3.

Step 102B1: The permission setting apparatus receives the first sub-input of dragging the first control to an area in which the first icon is located by the user.

Step 103B1: The permission setting apparatus displays Q options in response to the first sub-input, where each option is used for indicating one function permission respectively.

Step 103B2: The permission setting apparatus receives the second sub-input to T options in the Q options by the user.

Step 103B3: The permission setting apparatus sets T function permissions for the first application program in response to the second sub-input.

The T function permissions are function permissions corresponding to the T options. Q is an integer greater than 1, and T is a positive integer less than or equal to Q.

Figure 10:
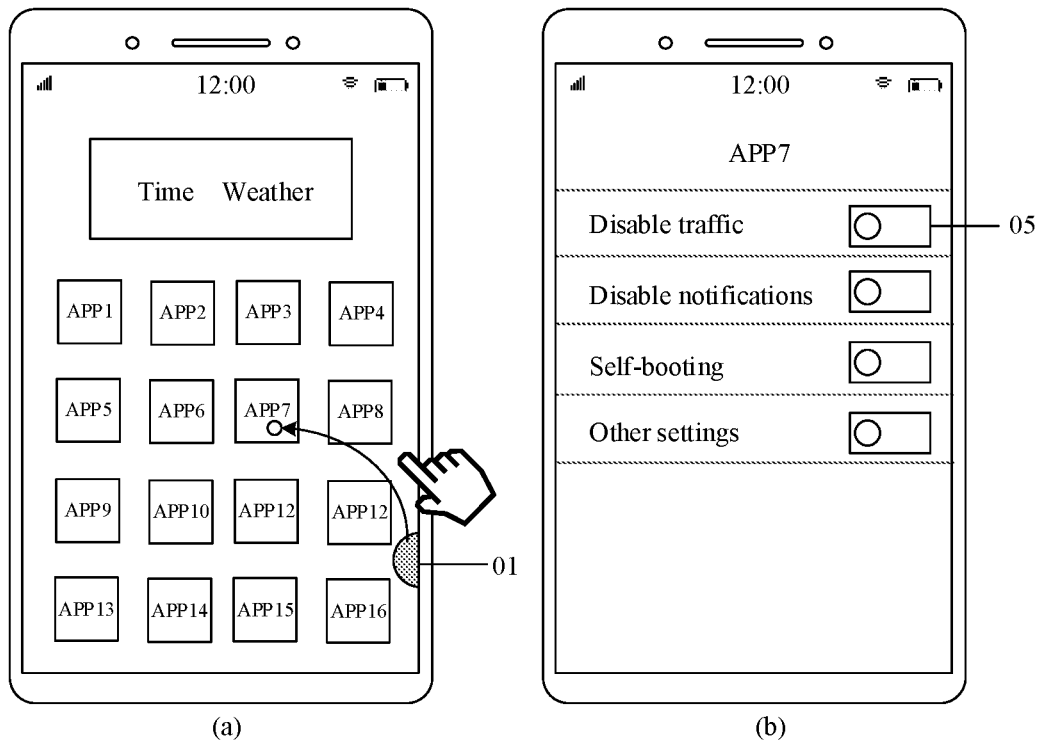
FIG. 10 is a schematic diagram 3 of an operation on a first icon and a first control according to an embodiment of this application.

For example, as shown in (a) of FIG. 10, in a case that the first control 01 is displayed, the user may press the first control 01 and drag the first control 01 to an area in which "APP7" is located. In a case that a stop time of the first control 01 in the area in which "APP7" is located is greater than or equal to a preset time (for example, two seconds), the permission setting apparatus may display a permission setting interface corresponding to "APP7" shown in (b) of FIG. 10. The permission setting interface may include a plurality of permission setting items such as "Disable traffic", "Disable notifications", "Self-booting", and "Other settings", and each item corresponds to one switch control 05. If the user sets the switch controls 05 corresponding to "Disable traffic", "Disable notifications", and "Self-booting" into an open state, functions of disabling wireless data, disabling notification messages, and enabling self-booting are set for an application program indicated by "APP7".

According to the permission setting method provided in this embodiment of this application, at least one function permission may be quickly set for an application program by dragging the first control to an area in which an icon of the application program is located, so as to eliminate complex steps of searching a setting application list for application programs one by one, thereby making operations more user friendly.

It should be noted that, in the permission setting method provided in this embodiment of this application, an execution subject may be the permission setting apparatus, or a control module configured to perform the permission setting method in the permission setting apparatus. In an embodiment of this application, a permission setting apparatus provided in this embodiment of this application is described by using an example in which the permission setting apparatus performs the permission setting method.

Figure 11:
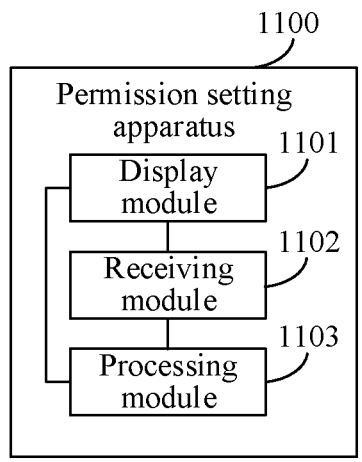
FIG. 11 is a schematic structural diagram of a permission setting apparatus according to an embodiment of this application.

As shown in FIG. 11, this embodiment of this application provides a permission setting apparatus 1100. The permission setting apparatus includes a display module 1101, a receiving module 1102, and a processing module 1103. The display module 1101 may be configured to display a first control on a desktop. The receiving module 1102 may be configured to receive a first input to the first control and a first icon by a user. The processing module 1103 may be configured to set a first function permission for a first application program in response to the first input received by the receiving module 1102, where the first application program is an application program indicated by the first icon, and the first function permission is a function permission in a plurality of function permissions associated with the first control.

Optionally, the first input is an input of dragging the first icon to an area in which the first control is located. The receiving module 1102 may be further configured to: before receiving the first input, receive a second input to the first control by the user. The display module 1101 may be further configured to display M options on the desktop in response to the second input received by receiving module 1102, where each option is used for indicating at least one function permission respectively, and M is a positive integer. The receiving module 1102 may be further configured to receive a third input to a first option in the M options by the user. The display module 1101 may be further configured to: cancel display of the M options in response to the third input received by the receiving module 1102, and display a first identifier in the area in which the first control is located. The first identifier and the first option are both used for indicating the first function permission.

Optionally, the display module 1101 may be further configured to display one second identifier on each icon of N icons on the desktop respectively in response to the third input received by the receiving module 1102. A second identifier on one icon is used for indicating that the first function permission has been set for an application program indicated by the one icon, and N is a positive integer.

Optionally, the receiving module 1102 may be further configured to: after the M options are displayed on the desktop, receive a fourth input to the first option by the user. The display module 1101 may be further configured to display P icons in response to the fourth input received by the receiving module 1102, where the first function permission has been set for all P application programs indicated by the P icons, and P is a positive integer. The receiving module 1102 may be further configured to receive a fifth input to a second icon in the P icons by the user. The processing module 1103 may be further configured to cancel, in response to the fifth input received by the receiving module 1102, a setting of the first function permission for an application program indicated by the second icon.

Optionally, the first input is specifically an input of dragging a first sub-icon and a second sub-icon to the area in which the first control is located. The processing module 1103 may be further configured to: determine a plurality of sub-icons according to the first sub-icon and the second sub-icon in response to the first input, and set the first function permission for a plurality of application programs indicated by the plurality of sub-icons. The plurality of sub-icons includes the first sub-icon, the second sub-icon, and other sub-icons.

Optionally, the first application program belongs to a target type, and the first option is specifically used for indicating a plurality of first function permissions corresponding to the target type. The receiving module 1102 may be further configured to: before receiving the second input to the first control, receive a sixth input by the user. The processing module 1103 may be further configured to create association relationships between an application program of the target type and the plurality of first function permissions in response to the sixth input received by the receiving module 1102.

Optionally, the first input includes a first sub-input and a second sub-input. The receiving module 1102 may be further configured to receive the first sub-input of dragging the first control to an area in which the first icon is located by the user. The display module 1101 may be further configured to display Q options in response to the first sub-input received by the receiving module 1102, where each option is used for indicating one function permission respectively. The receiving module 1102 may be further configured to receive the second sub-input to T options in the Q options by the user. The processing module 1103 may be further configured to set T function permissions for the first application program in response to the second sub-input received by the receiving module 1102, where the T function permissions are function permissions corresponding to the T options. Q is an integer greater than 1, and T is a positive integer less than or equal to Q.

According to the permission setting apparatus provided in this embodiment of this application, because the permission setting apparatus may display the first control associated with the plurality of function permissions on the desktop, the user may use an input to the first control and the first icon to trigger the permission setting apparatus to quickly set the first function permission for the application program indicated by the first icon, thereby simplifying steps of setting a function permission for an application program and improving efficiency of setting a function permission for an application program.

The permission setting apparatus in this embodiment of this application may be an apparatus, or may be a component, an integrated circuit, or a chip in a terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA); and the non-mobile electronic device may be a server, a network attached storage (NAS), a personal computer (PC), a television (TV), a teller machine, or an automated machine, which are not specifically limited in the embodiments of this application.

The permission setting apparatus in this embodiment of this application may be an apparatus with an operating system. The operating system may be an Android operating system, may be an ios operating system, or may be another possible operating system, and is not specifically limited in the embodiments of this application.

The permission setting apparatus according to this embodiment of this application can implement all processes implemented in the method embodiments shown in FIG. 1 to FIG. 10. To avoid repetition, details are not described herein again.

Figure 12:
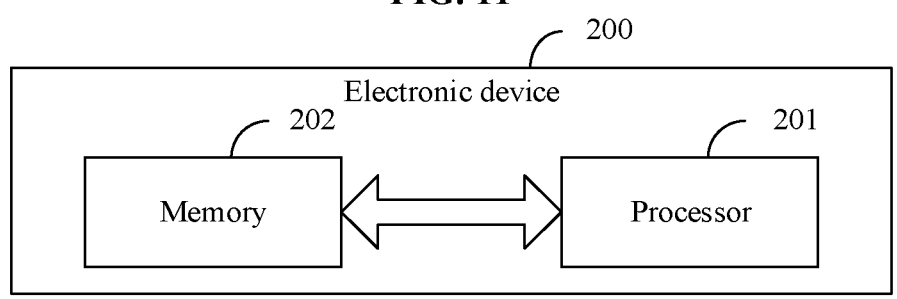
FIG. 12 is a schematic diagram 1 of the hardware of an electronic device according to an embodiment of this application.

Optionally, as shown in FIG. 12, an embodiment of this application further provides an electronic device 200, including a processor 201, a memory 202, and a computer program or an instruction stored in the memory 202 and capable of being run on the processor 201, and the program or the instruction, when executed by the processor 201, implements the processes of the embodiments of the permission setting method, and can achieve the same technical effects. To avoid repetition, details are not described herein again.

It should be noted that, the electronic device in this embodiment of this application includes the foregoing mobile electronic device and the non-mobile electronic device.

Figure 13:
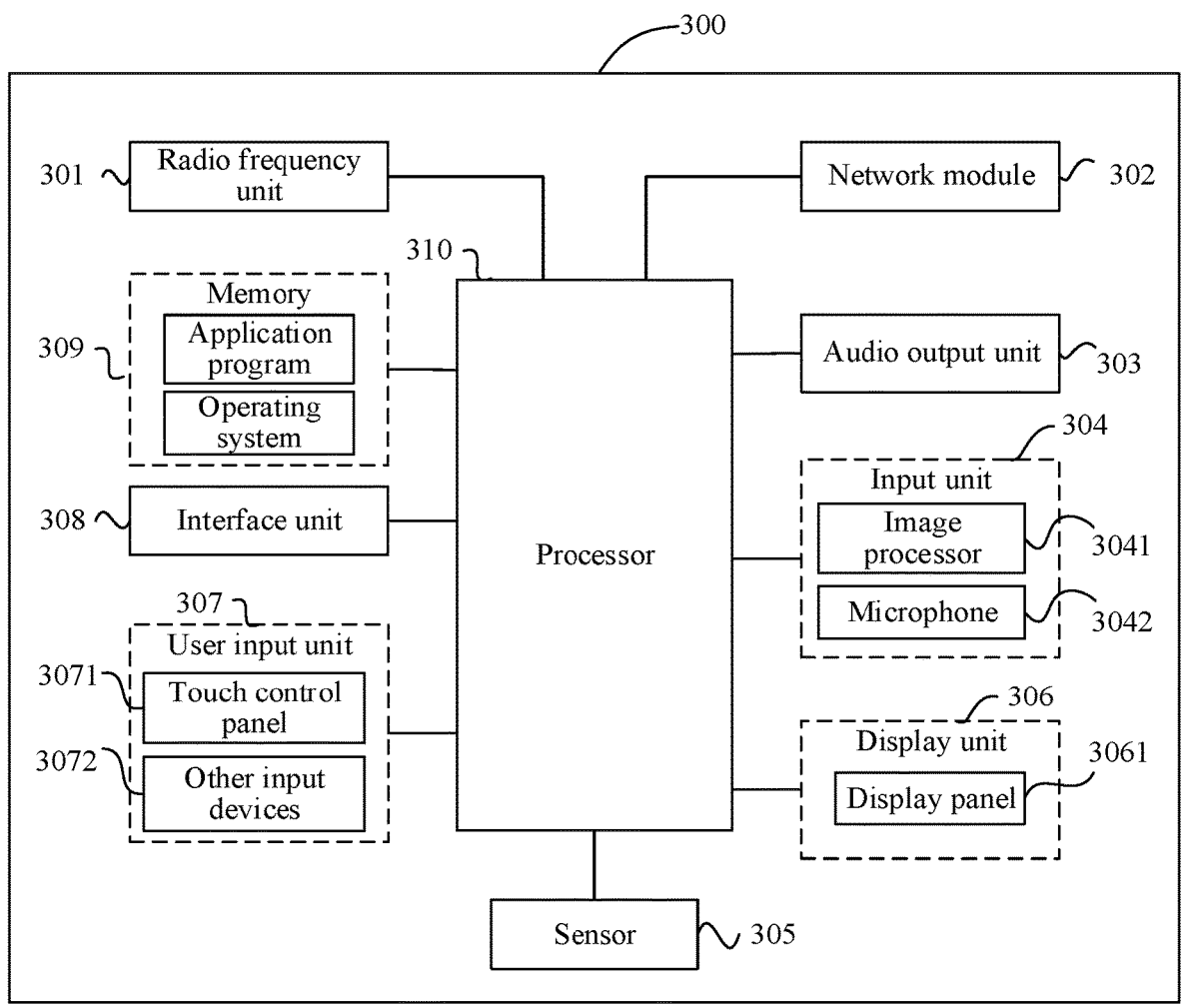
FIG. 13 is a schematic diagram 2 of the hardware of an electronic device according to an embodiment of this application.

FIG. 13 is a schematic diagram of a hardware structure of an electronic device for implementing this embodiment of this application.

The electronic device 300 includes but is not limited to: components such as a radio frequency unit 301, a network module 302, an audio output unit 303, an input unit 304, a sensor 305, a display unit 306, a user input unit 307, an interface unit 308, a memory 309, and a processor 310.

A person skilled in the art may understand that, the electronic device 300 may further include a power supply (such as a battery) for supplying power to the components. The power supply may logically connect to the processor 310 by using a power supply management system, thereby implementing functions, such as charging, discharging, and power consumption management, by using the power supply management system. The electronic device structure shown in FIG. 13 constitutes no limitation on an electronic device, and may comprise more or fewer components than those shown in the figure, or some components may be combined, or a different component deployment may be used. Details are not described herein again.

The display unit 306 may be configured to display a first control on a desktop. The user input unit 307 may be configured to receive a first input to the first control and a first icon by a user. The processor 310 may be configured to set a first function permission for a first application program in response to the first input received by the user input unit 307, where the first application program is an application program indicated by the first icon, and the first function permission is a function permission in a plurality of function permissions associated with the first control.

Optionally, the first input is an input of dragging the first icon to an area in which the first control is located. The user input unit 307 may be further configured to: before receiving the first input, receive a second input to the first control by the user. The display unit 306 may be further configured to display M options on the desktop in response to the second input received by the user input unit 307, where each option is used for indicating at least one function permission respectively, and M is a positive integer. The user input unit 307 may be further configured to receive a third input to a first option in the M options by the user. The display unit 306 may be further configured to: cancel display of the M options in response to the third input received by the user input unit 307, and display a first identifier in the area in which the first control is located. The first identifier and the first option are both used for indicating the first function permission.

Optionally, the display unit 306 may be further configured to display one second identifier on each icon of N icons on the desktop respectively in response to the third input received by the user input unit 307. A second identifier on one icon is used for indicating that the first function permission has been set for an application program indicated by the one icon, and N is a positive integer.

Optionally, the user input unit 307 may be further configured to: after the M options are displayed on the desktop, receive a fourth input to the first option by the user. The display unit 306 may be further configured to display P icons in response to the fourth input received by the user input unit 307, where the first function permission has been set for all P application programs indicated by the P icons, and P is a positive integer. The user input unit 307 may be further configured to receive a fifth input to a second icon in the P icons by the user. The processor 310 may be further configured to cancel, in response to the fifth input received by the user input unit 307, a setting of the first function permission for an application program indicated by the second icon.

Optionally, the first input is specifically an input of dragging a first sub-icon and a second sub-icon to the area in which the first control is located. The processor 310 may be further configured to: determine a plurality of sub-icons according to the first sub-icon and the second sub-icon in response to the first input, and set the first function permission for a plurality of application programs indicated by the plurality of sub-icons. The plurality of sub-icons includes the first sub-icon, the second sub-icon, and other sub-icons.

Optionally, the first application program belongs to a target type, and the first option is specifically used for indicating a plurality of first function permissions corresponding to the target type. The user input unit 307 may be further configured to: before receiving the second input to the first control, receive a sixth input by the user. The processor 310 may be further configured to create association relationships between an application program of the target type and the plurality of first function permissions in response to the sixth input received by the user input unit 307.

Optionally, the first input includes a first sub-input and a second sub-input. The user input unit 307 may be further configured to receive the first sub-input of dragging the first control to an area in which the first icon is located by the user. The display unit 306 may be further configured to display Q options in response to the first sub-input received by the user input unit 307, where each option is used for indicating one function permission respectively. The user input unit 307 may be further configured to receive the second sub-input to T options in the Q options by the user. The processor 310 may be further configured to set T function permissions for the first application program in response to the second sub-input received by the user input unit 307, where the T function permissions are function permissions corresponding to the T options. Q is an integer greater than 1, and T is a positive integer less than or equal to Q.

According to the electronic device provided in this embodiment of this application, because the electronic device may display the first control associated with the plurality of function permissions on the desktop, the user may use an input to the first control and the first icon to trigger the electronic device to quickly set the first function permission for the application program indicated by the first icon, thereby simplifying steps of setting a function permission for an application program and improving efficiency of setting a function permission for an application program.

It should be understood that, in this embodiment of this application, the input unit 304 may include a graphics processing unit (GPU) 3041 and a microphone 3042. The graphics processing unit 3041 performs processing on image data of a static picture or a video that is obtained by an image acquisition device (for example, a camera) in a video acquisition mode or an image acquisition mode. The display unit 306 may include a display panel 3061, the display panel 3061 may be configured in a form such as a liquid crystal display or an organic light-emitting diode. The user the input unit 307 includes a touch control panel 3071 and another input device 3072. The touch control panel 3071 is also referred to as a touch screen. The touch control panel 3071 may include two parts: a touch detection apparatus and a touch controller. The another input device 3072 may include, but not limited to, a physical keyboard, a functional key (such as a volume control key or a switch key), a track ball, a mouse, and a joystick, which are not described herein in detail. The memory 309 is configured to store a software program and various data including but not limited to an application program and an operating system. The processor 310 may integrate an application processor and a modem. The application processor mainly processes an operating system, a user interface, an application, and the like. The modem mainly processes wireless communication. It may be understood that the modem processor may either not be integrated into the processor 310.

An embodiment of this application further provides a readable storage medium, where the readable storage medium stores a program or an instruction, and the program or the instruction, when executed by a processor, implements the processes of the embodiments of the permission setting method, and can achieve the same technical effects. To avoid repetition, details are not described herein again.

The processor is the processor in the electronic device of the foregoing embodiments. The readable storage medium includes a computer-readable storage medium, for computer example, a read-only memory (ROM), a random access memory (RAM), a magnetic disk, or an optical disc.

An embodiment of this application further provides a chip, where the chip includes a processor and a communications interface, the communications interface is coupled with the processor, and the processor is configured to run a program or an instruction, to implement the processes of the embodiments of the permission setting method, and can achieve the same technical effects. To avoid repetition, details are not described herein again.

It should be understood that, the chip mentioned in this embodiment of this application may also be referred to as a system-level chip, a system chip, a chip system, a system on chip, or the like.

It should be noted that, terms "comprise", "comprise", and any variants thereof are intended to cover a non-exclusive inclusion. Therefore, in the context of a process, method, object, or device that comprises a series of elements, the process, method, object, or device not only comprises such elements, but also comprises other elements not specified expressly, or may comprise inherent elements of the process, method, object, or device. Without more limitations, elements defined by the sentence "comprising one" does not exclude that there are still other same elements in the processes, methods, objects, or apparatuses. In addition, it should be noted that, the scope of the method and the apparatus in the embodiments of this application is not limited to a shown sequence or a discussed sequence to perform functions, and may further include performing functions in a basically simultaneous manner or a converse sequence based on the involved functions, for example, the described method may be performed in a sequence different from the description, and various steps may be added, removed, and combined. In addition, features described by referring to some examples may be combined in other examples.

Through the foregoing description in the foregoing implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods provided in the embodiments of this application.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A permission setting method, wherein the method comprises:
  displaying a first control on a desktop;
  receiving a first input to the first control and a first icon by a user; and
  setting a first function permission for a first application program in response to the first input, wherein the first application program is an application program indicated by the first icon, and the first function permission is a function permission in a plurality of function permissions associated with the first control;
  wherein the first input is an input of dragging the first icon to an area in which the first control is located; and
  before the receiving the first input to the first control and the first icon by the user, the method further comprises:
  receiving a second input to the first control by the user;
  displaying M options on the desktop in response to the second input, wherein each option is used for indicating at least one function permission respectively, and M is a positive integer;
  receiving a third input to a first option in the M options by the user; and
  canceling display of the M options in response to the third input, and displaying a first identifier in the area in which the first control is located, wherein
  the first identifier and the first option are both used for indicating the first function permission.

2. The method according to claim 1, wherein the method further comprises:
  displaying one second identifier on each icon of N icons on the desktop respectively in response to the third input, wherein a second identifier on one icon is used for indicating that the first function permission has been set for an application program indicated by the one icon, and N is a positive integer.

3. The method according to claim 1, wherein after the displaying M options on the desktop, the method further comprises:
  receiving a fourth input to the first option by the user;
  displaying P icons in response to the fourth input, wherein the first function permission has been set for all P application programs indicated by the P icons, and P is a positive integer;
  receiving a fifth input to a second icon in the P icons by the user; and
  canceling, in response to the fifth input, a setting of the first function permission for an application program indicated by the second icon.

4. The method according to claim 1, wherein the first input is specifically an input of dragging a first sub-icon and a second sub-icon to the area in which the first control is located; and
  the setting a first function permission for a first application program in response to the first input comprises:
  determining a plurality of sub-icons according to the first sub-icon and the second sub-icon in response to the first input, and setting the first function permission for a plurality of application programs indicated by the plurality of sub-icons, wherein the plurality of sub-icons comprise the first sub-icon, the second sub-icon, and other sub-icons.

5. The method according to claim 1, wherein the first application program belongs to a target type, and the first option is specifically used for indicating a plurality of first function permissions corresponding to the target type; and
  before the receiving a second input to the first control by the user, the method further comprises:
  receiving a sixth input by the user; and
  creating association relationships between an application program of the target type and the plurality of first function permissions in response to the sixth input.

6. The method according to claim 1, wherein the first input comprises a first sub-input and a second sub-input;
  the receiving a first input to the first control and a first icon by a user comprises:
  receiving the first sub-input of dragging the first control to an area in which the first icon is located by the user; and
  the setting a first function permission for a first application program in response to the first input comprises:
  displaying Q options in response to the first sub-input, wherein each option is used for indicating one function permission respectively;
  receiving the second sub-input to T options in the Q options by the user; and
  setting T function permissions for the first application program in response to the second sub-input, wherein the T function permissions are function permissions corresponding to the T options, wherein
  Q is an integer greater than 1, and T is a positive integer less than or equal to Q.

7. A permission setting apparatus, comprising: a memory, a processor and a computer program stored in the memory and executable by the processor, wherein the processor executes the computer program to:
  display a first control on a desktop;
  receive a first input to the first control and a first icon by a user; and
  set a first function permission for a first application program in response to the first input received, wherein the first application program is an application program indicated by the first icon, and the first function permission is a function permission in a plurality of function permissions associated with the first control;
  wherein the first input is an input of dragging the first icon to an area in which the first control is located; the processor executes the computer program to:
  before receiving the first input, receive a second input to the first control by the user;
  display M options on the desktop in response to the second input received, wherein each option is used for indicating at least one function permission respectively, and M is a positive integer;
  receive a third input to a first option in the M options by the user; and
  cancel display of the M options in response to the third input received, and display a first identifier in the area in which the first control is located, wherein
  the first identifier and the first option are both used for indicating the first function permission.

8. The permission setting apparatus according to claim 7, wherein the processor executes the computer program to:
  display one second identifier on each icon of N icons on the desktop respectively in response to the third input received, wherein a second identifier on one icon is used for indicating that the first function permission has been set for an application program indicated by the one icon, and N is a positive integer.

9. The permission setting apparatus according to claim 7, wherein the processor executes the computer program to:
  after the M options are displayed on the desktop, receive a fourth input to the first option by the user;

display P icons in response to the fourth input received, wherein the first function permission has been set for all P application programs indicated by the P icons, and P is a positive integer;

receive a fifth input to a second icon in the P icons by the user; and cancel, in response to the fifth input received, a setting of the first function permission for an application program indicated by the second icon.

10. The permission setting apparatus according to claim 7, wherein the first input is specifically an input of dragging a first sub-icon and a second sub-icon to the area in which the first control is located; and the processor executes the computer program to:

determine a plurality of sub-icons according to the first sub-icon and the second sub-icon in response to the first input received, and set the first function permission for a plurality of application programs indicated by the plurality of sub-icons, wherein the plurality of sub-icons comprise the first sub-icon, the second sub-icon, and other sub-icons.

11. The permission setting apparatus according to claim 7, wherein the first application program belongs to a target type, and the first option is specifically used for indicating a plurality of first function permissions corresponding to the target type; the processor executes the computer program to:

before receiving the second input to the first control by the user, receive a sixth input by the user; and create association relationships between an application program of the target type and the plurality of first function permissions in response to the sixth input received.

12. The permission setting apparatus according to claim 7, wherein the first input comprises a first sub-input and a second sub-input; the processor executes the computer program to:

receive the first sub-input of dragging the first control to an area in which the first icon is located by the user;

display Q options in response to the first sub-input received, wherein each option is used for indicating one function permission respectively;

receive the second sub-input to T options in the Q options by the user; and set T function permissions for the first application program in response to the second sub-input received, wherein the T function permissions are function permissions corresponding to the T options, wherein Q is an integer greater than 1, and T is a positive integer less than or equal to Q.

13. A readable storage medium, wherein the readable storage medium stores a program or an instruction, and the processor executes the program or the instruction to:

display a first control on a desktop;

receive a first input to the first control and a first icon by a user; and set a first function permission for a first application program in response to the first input, wherein the first application program is an application program indicated by the first icon, and the first function permission is a function permission in a plurality of function permissions associated with the first control;

wherein the first input is an input of dragging the first icon to an area in which the first control is located; and before the receiving the first input to the first control and the first icon by the user, the processor executes the program or the instruction to:

receive a second input to the first control by the user;

display M options on the desktop in response to the second input, wherein each option is used for indicating at least one function permission respectively, and M is a positive integer;

receive a third input to a first option in the M options by the user; and cancel display of the M options in response to the third input, and display a first identifier in the area in which the first control is located, wherein the first identifier and the first option are both used for indicating the first function permission.

14. The readable storage medium according to claim 13, wherein the processor executes the program or the instruction to:

display one second identifier on each icon of N icons on the desktop respectively in response to the third input, wherein a second identifier on one icon is used for indicating that the first function permission has been set for an application program indicated by the one icon, and N is a positive integer.

15. The readable storage medium according to claim 13, wherein after the displaying M options on the desktop, the processor executes the program or the instruction to:

receive a fourth input to the first option by the user;

display P icons in response to the fourth input, wherein the first function permission has been set for all P application programs indicated by the P icons, and P is a positive integer;

receive a fifth input to a second icon in the P icons by the user; and cancel, in response to the fifth input, a setting of the first function permission for an application program indicated by the second icon.

16. The readable storage medium according to claim 13, wherein the first input is specifically an input of dragging a first sub-icon and a second sub-icon to the area in which the first control is located; and the processor executes the program or the instruction to:

determine a plurality of sub-icons according to the first sub-icon and the second sub-icon in response to the first input, and set the first function permission for a plurality of application programs indicated by the plurality of sub-icons, wherein the plurality of sub-icons comprise the first sub-icon, the second sub-icon, and other sub-icons.

17. The readable storage medium according to claim 13, wherein the first input comprises a first sub-input and a second sub-input;

the processor executes the program or the instruction to:

receive the first sub-input of dragging the first control to an area in which the first icon is located by the user; and the processor executes the program or the instruction to:

display Q options in response to the first sub-input, wherein each option is used for indicating one function permission respectively;

receive the second sub-input to T options in the Q options by the user; and set T function permissions for the first application program in response to the second sub-input, wherein the T function permissions are function permissions corresponding to the T options, wherein Q is an integer greater than 1, and T is a positive integer less than or equal to Q.

* * * * *